(12) United States Patent
Ricks et al.

(10) Patent No.: US 8,292,442 B2
(45) Date of Patent: Oct. 23, 2012

(54) FRESNEL MIRROR AND METHOD FOR THE PRODUCTION THEREOF

(75) Inventors: Karl Ricks, Krefeld (DE); Bernd Fausten, Velbert (DE)

(73) Assignee: Erbslöh Aluminium GmbH, Velbert (DE)

( * ) Notice: Subject to any disclaimer, the term of this patent is extended or adjusted under 35 U.S.C. 154(b) by 146 days.

(21) Appl. No.: 12/735,097

(22) PCT Filed: Dec. 10, 2008

(86) PCT No.: PCT/EP2008/010469
§ 371 (c)(1),
(2), (4) Date: Jun. 15, 2010

(87) PCT Pub. No.: WO2009/077112
PCT Pub. Date: Jun. 25, 2009

(65) Prior Publication Data
US 2010/0309569 A1     Dec. 9, 2010

(30) Foreign Application Priority Data
Dec. 17, 2007 (DE) .......................... 10 2007 061 153

(51) Int. Cl.
*G02B 5/08* (2006.01)
(52) U.S. Cl. ...................................................... 359/851

(58) Field of Classification Search .................. 359/850, 359/851, 853, 857; 126/658, 690, 698
See application file for complete search history.

(56) References Cited

U.S. PATENT DOCUMENTS

| 3,058,394 A | | 10/1962 | Edlin |
| 3,982,527 A | * | 9/1976 | Cheng et al. .................. 126/690 |
| 4,131,336 A | | 12/1978 | Miller et al. |
| 4,222,368 A | | 9/1980 | Rost et al. |
| 4,301,321 A | | 11/1981 | Bartels |
| 4,784,700 A | * | 11/1988 | Stern et al. .................... 359/853 |

FOREIGN PATENT DOCUMENTS

| DE | 8622427.1 | 11/1986 |
| DE | 10248064 | 4/2004 |
| DE | 102007061153 | 6/2009 |
| EP | 2223175 | 6/2009 |
| JP | 57122401 | 7/1982 |
| WO | WO/2009/077112 | 6/2009 |

* cited by examiner

*Primary Examiner* — Euncha Cherry
(74) *Attorney, Agent, or Firm* — Horst M. Kasper

(57) ABSTRACT

The invention relates to a simple Fresnel structure that can be produced automatically and easily, and can be used for broad application in the use of solar energy or as a reflector in the lighting industry. A Fresnel mirror according to the invention for the directed reflection of light is made of a flat carrier part (10) having a Fresnel structure (20) on the upper side thereof, wherein the individual steps (21, 22, 23) of the Fresnel structure (20) have a reflective surface as an active surface (30).

8 Claims, 5 Drawing Sheets

FRESNEL MIRROR AND METHOD FOR THE PRODUCTION THEREOF

BACKGROUND OF THE INVENTION

1. Field of the Invention

The invention relates to a Fresnel mirror for the directed reflection of light, in particular of sunlight and/or for directing of artificial light in illumination systems, as well as a method for producing such a Fresnel mirror.

2. Brief Description of the Background of the Invention Including Prior Art

A Fresnel lens is known, which exhibits a step shaped cross section and which was originally developed for lighthouses. The Fresnel step lens enables the construction of large lenses with short focal lengths, without the weight and volume of conventional lenses, since cheap Fresnel lenses can also be produced of plastic. Typical problems of plastic lenses are power losses based on environmental influences and mechanical damages based on bending through as well as temperature loading.

The application of the Fresnel principle is also known from the German printed patent document DE 102 48064. The solar tower power plant is shown in this printed patent document. The sunlight is reflected by a helio stat field is concentrated and absorbed in a tower absorber. The helio stat field comprises several individual mirrors, which are installed according to the Fresnel principle. This helio stat field reflects the sunlight always onto the same spatially fixed point independent of the change of the position of the sun in the sky. The power loss through the long focal length is disadvantageous.

Furthermore, a large linear reflector for gaining solar energy is shown in the U.S. Pat. No. 4,131,336. The Fresnel structure is here entered into a formed and stabilized earth floor and the reflection is made possible through polymer foils coated with aluminum and placed over the earth floor. Disadvantageous in the context of this Fresnel structure is the high power loss based on the high component part of non-directed reflection.

The large expenditure and the construction sizes for obtaining the reflecting structure are disadvantageous in connection with the previously cited applications, which prevents a large field of application.

It is an object of the present invention to furnish a simple Fresnel structure, which can be easily and automatically produced and can be employed for wide application in the use of solar energy or as a reflector in the illumination industry.

SUMMARY OF THE INVENTION

1. Purposes of the Invention
2. Brief Description of the Invention

This object is obtained with a Fresnel mirror having the features of claim 1. Such a Fresnel mirror can alternatively be produced according to a method specified in claim 15, 16, 20 or 24.

The Fresnel mirror according to the present invention for the directed reflection of light is an essentially flat carrier part in contrast to known parabolic mirrors. This carrier part has on its upper side a Fresnel structure and the individual steps of the Fresnel structure exhibit a reflecting surface as an effective face.

The carrier part as base part of the Fresnel mirror according to an embodiment variation is solidly connected to a second device component which is formed as a Fresnel mirror or however the carrier part as a base part is formed as a single part with the Fresnel structure according to a further embodiment. In the latter case thus the carrier part consists of one and the same material or, respectively, work piece, wherein preferably the Fresnel structure is formed into the base part.

The carrier part consists of metal, plastic or another suitable material. A carrier part made of plastic or metal, which is produced by injection molding, can easily be furnished with a Fresnel structure during production. A carrier part with the formed Fresnel structure produced in such manner, however, has to be furnished with a reflecting surface, for example by coating the steps of the Fresnel structure with a silver layer, with a highly pure metal aluminum layer or another suitable coating.

According to a further embodiment, the carrier part of the Fresnel mirror consists of sheet metal. A Fresnel structure can be brought into the carrier part out of metal by reforming. According to a preferred embodiment, a stainless steel sheet metal or an aluminum sheet metal can be employed as the metal carrier part. The entering of the Fresnel structure in this case can be performed in a simple way by designing, embossing, rolling, deep drawing, hydro forming or, respectively, float forming.

According to a further embodiment, the carrier part of the Fresnel mirror consists also out of metal, preferably out of aluminum or out of an aluminum alloy and is produced by extruding. The Fresnel structure is formed simultaneously with the extruding of the carrier part.

If the metal of the carrier part and therewith the Fresnel structure already has a high reflection, then an additional coating of the steps of the Fresnel structure serving as an effective face can be dispensed with. Alternatively, a highly reflecting layer can be applied on the steps of the Fresnel structure.

Depending on the application, for example upon the employment of a Fresnel mirror in an outer region, where the Fresnel mirror is subjected to the influences of the weather, the reflecting surface of the Fresnel structure functioning as an effective face is additionally furnished with a weather resistant protective layer. A suitable thin transparent layer of lacquer can provide such a protective layer. The weather resistant protective layer can be obtained by anodizing and densifying of the aluminum material in case aluminum is employed for the production of the Fresnel mirror, in particular where the Fresnel mirror is made of an aluminum alloy with very high aluminum contents, wherein the aluminum alloy has a sufficient reflection for the reflecting surface of the Fresnel structure.

As with the known sun light absorbers such a Fresnel mirror possibly equipped with a tracking system can be employed to reflect the sun light to a spatially fixed point or a line. In this case, where the reflection occurs toward a spatially fixed point, the Fresnel structure of the Fresnel mirror exhibits ring shaped steps, which result in a concentric structure. A solar cell for the construction of a solar collector can be disposed at the spatially fixed point, at which the sun light rays come together. This solar cell converts the radiation energy gained from the sun light directly into electrical energy and conducts this energy for use to corresponding users. An alternative embodiment of the Fresnel mirror has square shape rings, which are again positioned concentrically and which reflect the sun light to a spatially fixed point (focal point). An alternative embodiment of the Fresnel mirror has rectangular steps. The square and rectangular embodiment is associated with the advantage that a better use is made out of the material and therewith the waste occurring in the production of the Fresnel mirror becomes decreased. Also an efficiency increase is possible by adaptation of the rectangular focal point to the geometry of the solar cell. A metallic concentric Fresnel structure is preferably formed out of a sheet metal. It is also possible to compose a concentric structure out of several sections out of a metal sheet or out of several sections of an extruder profile. In this case also in particular larger dimensioned Fresnel mirrors can be formed.

According to a further embodiment form of a Fresnel mirror, the sun light is reflected into a spatially fixed line. The Fresnel structure exhibits in this case steps parallel aligned relative to each other. Such a Fresnel mirror for example reflects the sun light onto a line, wherein an absorber tube can be disposed on the line which converts the energy of the sun light into thermal energy, for example for generation of steam. Also solar cells for obtaining energy can be furnished aligned in a row at the recited line. A Fresnel mirror with a metallic Fresnel structure with parallel aligned steps is preferably formed out of an extruder part. The Fresnel mirror with a metallic Fresnel structure can also comprise several extruder profiles connected to each other, wherein during extruding advantageously the connection means at the profiles are simultaneously generated.

The described Fresnel mirrors can be produced by way of different methods. If the carrier part of the Fresnel mirror is made of a metallic material, in particular out of a steel sheet metal or an aluminum sheet metal, there are two alternative methods proposed for production.

According to one possible method the rolled up metal sheet is cut into sheet metal plates, which exhibit the corresponding size and shape of the desired Fresnel mirror. If necessary, a form can be selected which is slightly larger and the over edge can be removed after the reforming or be made available for attachment parts. The cut sheet metal plate serving as a carrier part is inserted into a reforming device between two tool halves, wherein one tool half exhibits a negative shape of the desired Fresnel structure. The Fresnel structure is formed into the sheet metal plate by the reforming process. Such a reforming can be embossing, float forming, deep drawing or another hydro forming method. In case of large reforming installations or with small Fresnel mirrors, then the tool half can also exhibit more than one negative form of the Fresnel structure such that simultaneously several sheet metal plates can be reformed with each one being furnished with a Fresnel structure. In this case preferably and advantageously a large sheet metal plate is inserted into the reforming device and the sheet metal plate is subdivided and cut after the reforming such that the individual Fresnel mirrors are generated.

The effective faces can also be segmented and composed out of several part faces for production of larger Fresnel mirrors.

The sheet metal is directly inserted from a coil into a design roller device according to an alternative method. The design roller has at least one negative form of the desired Fresnel structure for generating the Fresnel structure. There can however also neighboring, both next to each other as also successively, several Fresnel structures be furnished on the design roller. Such a reforming method has also particular advantages where Fresnel mirrors are produced, which Fresnel mirrors exhibit steps aligned parallel to each other, in order to reflect the sun light onto a spatially fixed line. The forming of the Fresnel structure into the sheet metal plate serving as a carrier part is performed during the design rolling, in the following the designed sheet metal band is cut to the corresponding size and shape of the desired Fresnel mirror. The sheet metal is preferably an aluminum sheet metal with this method.

A further alternative and advantageous method for producing of a Fresnel mirror is performed by extrusion. A metal bar, in particular out of aluminum or an aluminum alloy, is reformed to a profile strand in the extruder. In the following there occurs—as is known for other profile geometries—a quenching and stretching of the profile strand, wherein the quenching process is dependent on the employed alloy. Desired partial lengths corresponding to the length of the desired Fresnel mirror are separated from this profile strand. The profile cross-section of the profile strand generated by extruding comprises the carrier part with the Fresnel structure on a wide side, that is the upper side, of the carrier part. Advantageously during the extruding of the carrier part simultaneously connection elements, reinforcements and assembly elements can be generated as parts of the overall profile. According to a particular embodiment, connection elements are furnished at the narrow sides of the carrier part, wherein the connection elements allow a shape matching connection of the profiles with Fresnel structure amongst each other and/or with other device components. An enlargement of the effective face of a Fresnel mirror becomes possible in this way. In the same way the profiles can also be connected to a central profile, which for example comprises a collector pipe, which is disposed in the focal line of the profiles composed to a Fresnel mirror.

In the case, where a sheet metal made out of a highly reflecting stainless steel or, respectively, out of aluminum and/or out of an aluminum alloy with very high aluminum contents is employed, no additionally reflecting layer has to be placed on the Fresnel structure. According to a preferred embodiment the sheet metal is cleaned, degreased and/or pickled for generating a highly shining, highly reflecting surface. Furthermore, a polishing process and/or a shiny making process can be provided at an aluminum alloy sheet metal prior to the reforming or after the reforming. The sensitive aluminum layer is protected by anodizing and densification. Densification can refer to cold densification and/or hot densification. The same treatment method is also applicable to Fresnel mirrors based on an extruder profile out of aluminum or an aluminum alloy.

In case a sheet metal with insufficient reflection capability is employed in the recited methods, then a highly reflecting layer can additionally be applied after the reforming. Such a layer is preferably a silver layer or a layer of a highly purified aluminum. Such an additional layer can also be furnished at a Fresnel mirror, wherein the carrier part of the Fresnel mirror comprises an injection molded part out of plastic or metal. The carrier part together with the Fresnel structure is produced as a single piece in an injection molding device in this case and in the following the steps of the Fresnel structure are coated with a highly reflecting layer.

Depending on the case of application, the surface of the Fresnel mirror can additionally be furnished with a weather resistant protective layer. This weather resistant layer has to be however transparent and should exhibit a low thickness.

A Fresnel mirror can be easily and automatically produced with all recited alternative methods and therefore is suitable for broad application in the use of solar energy.

Further details of the invention can be gathered by way of the following description of embodiment examples of the invention and by way of the drawings.

BRIEF DESCRIPTION OF THE DRAWING

There is shown in:

FIG. 1b a sectional view of the Fresnel mirror according to FIG. 1a;

DESCRIPTION OF INVENTION AND PREFERRED EMBODIMENTS

Figure 1A:
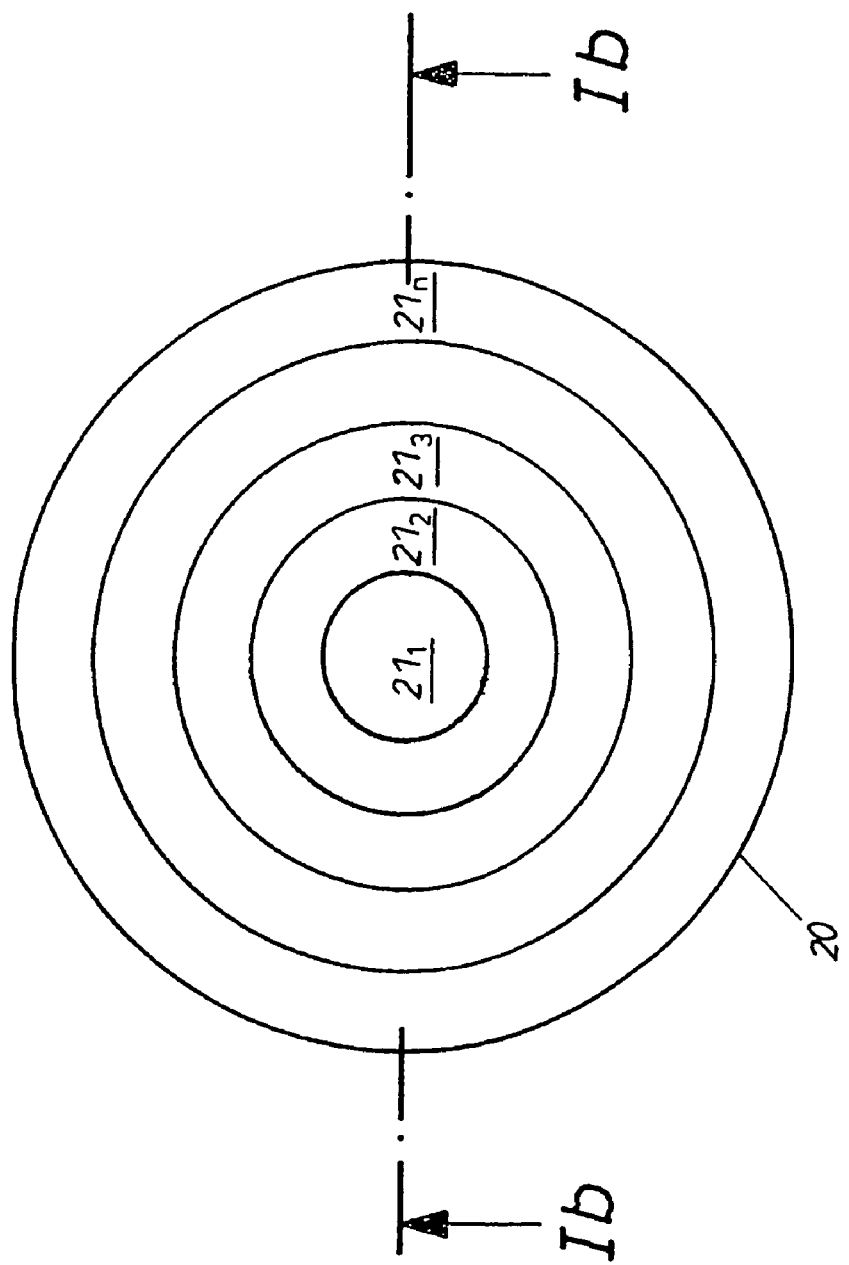
FIG. 1a a top planar view of a Fresnel mirror according to the invention.
Figure 1B:
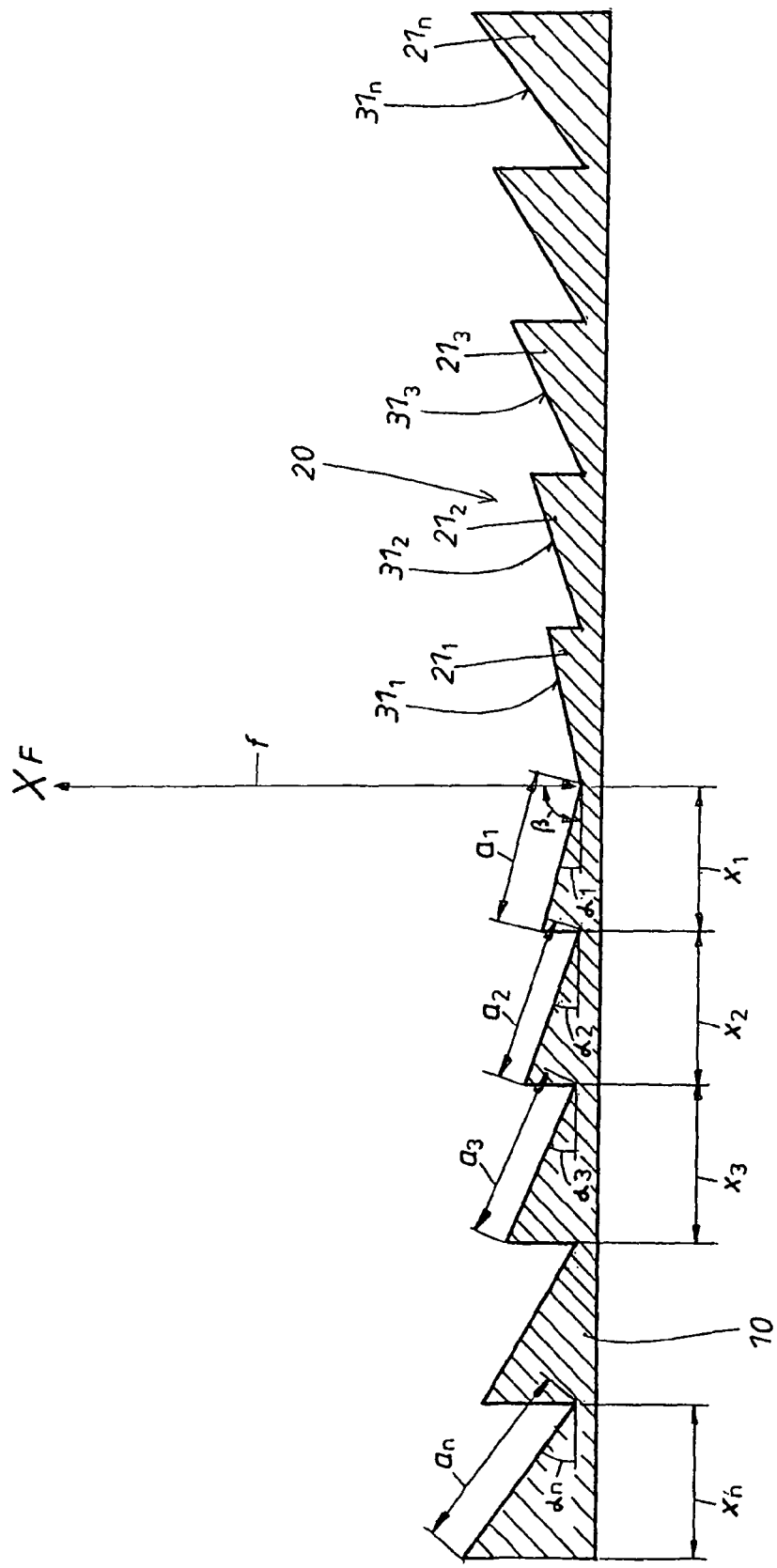

FIGS. 1a and 1b show a circular shaped Fresnel mirror with a round flat carrier part 10. A Fresnel structure 20 is indicated at the upper side of the carrier part 10. The angle of incidence 13 of the carrier element 10 amounts to 90° in this embodiment. This angle of incidence 13 can also be smaller than 90°. In this case the carrier part 10 would be inclined relative to the imaginary vertical between focal point F and center point of the carrier part 10.

The Fresnel structure 20 has ring shaped, concentric steps $21_1$, $21_2$, $21_3$ up to $21_n$ disposed around a center point. The carrier part 10 with the Fresnel Structure 20 consists out of a highly pure aluminum material and is produced of an aluminum sheet metal by design rolling. The surfaces of the individual steps $21_1$, $21_2$, $21_3$ up to $21_n$ represent the effective faces $31_1$, $31_2$, $31_3$ up to $31_n$ of the Fresnel mirror. Since this Fresnel mirror consists out of highly pure aluminum, an additional highly reflecting coating of the effective faces $31_1$, $31_2$, $31_3$ up to $31_n$ is not necessary. As can be gathered from FIG. 1b, rays of sun light (not illustrated), which fall on this Fresnel mirror are reflected by the effective faces $31_1$, $31_2$, $31_3$ up to $31_n$ to a point, the focal point F, wherein the focal point F is disposed remote by a focal length f from the center point of the concentric Fresnel structure 20. A solar cell can be positioned in the focal point F for obtaining energy from solar light. Also a focal point outside of the center can be accomplished by a suitable selection of the angles $\alpha_1$, $\alpha_2$, $\alpha_3$ up to $\alpha_n$ of the effective faces $31_1$, $31_2$, $31_3$ up to $31_n$.

The breadth of the steps $x_1$, $x_2$, $x_3$ up to $x_n$ is of equal size in the Fresnel mirror shown in FIGS. 1a and 1b. The breadth $x_1$, $x_2$, $x_3$ up to $x_n$ of the steps $21_1$, $21_2$, $21_3$ up to $21_n$ can however also be selected to be of differing size. It is more important that the angle of incidence $\alpha_1$, $\alpha_2$, $\alpha_3$ up to $\alpha_n$ of the effective faces $31_1$, $31_2$, $31_3$ up to $31_n$ increases from the center point of the Fresnel structure 20 toward the outside, that is incidence angle $\alpha_1$ is the smallest angle and the angle of incidence $\alpha_n$ is the largest angle. This means that the step $21_1$ has an effective face $31_1$, which is much more flat aligned as the effective face $31_n$ of the step $21_n$. The breadth $a_n$ of the outer step $31_n$ is therewith larger than the width $a_1$ of the inner ring shaped step $31_1$. The effective faces $31_1$, $31_2$, $31_3$ up to $31_n$ are represented as planar faces in the examples. They can also be arched concavely.

Figure 2B:
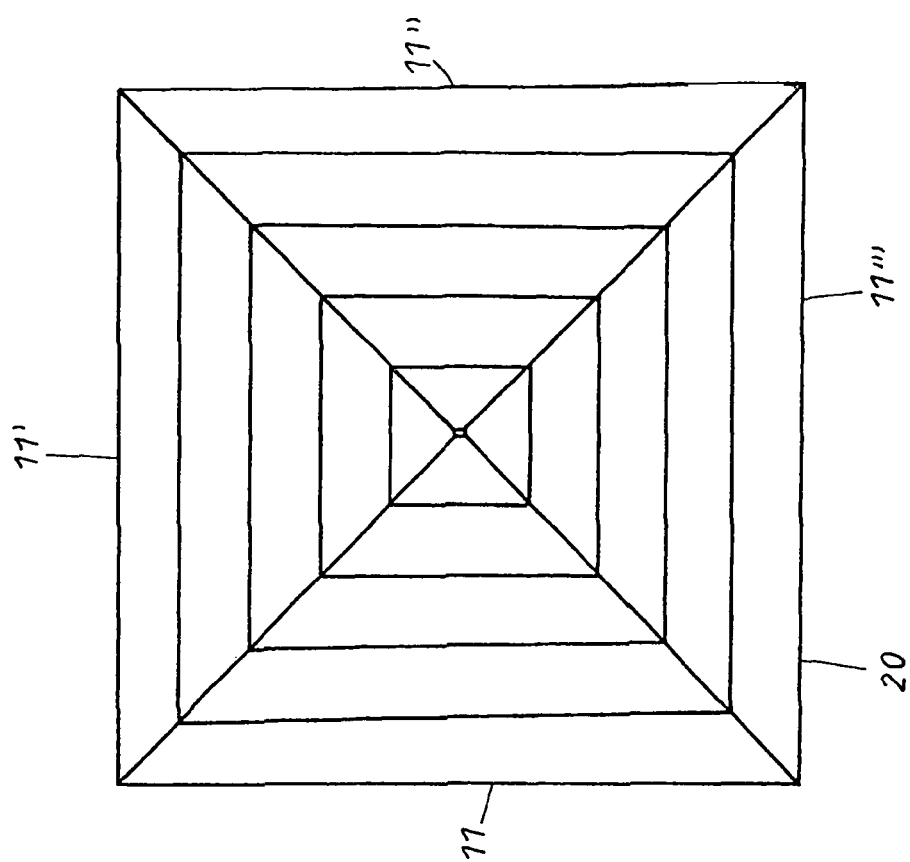
FIG. 2b a top planar view onto a further Fresnel mirror according to the invention.
Figure 2A:
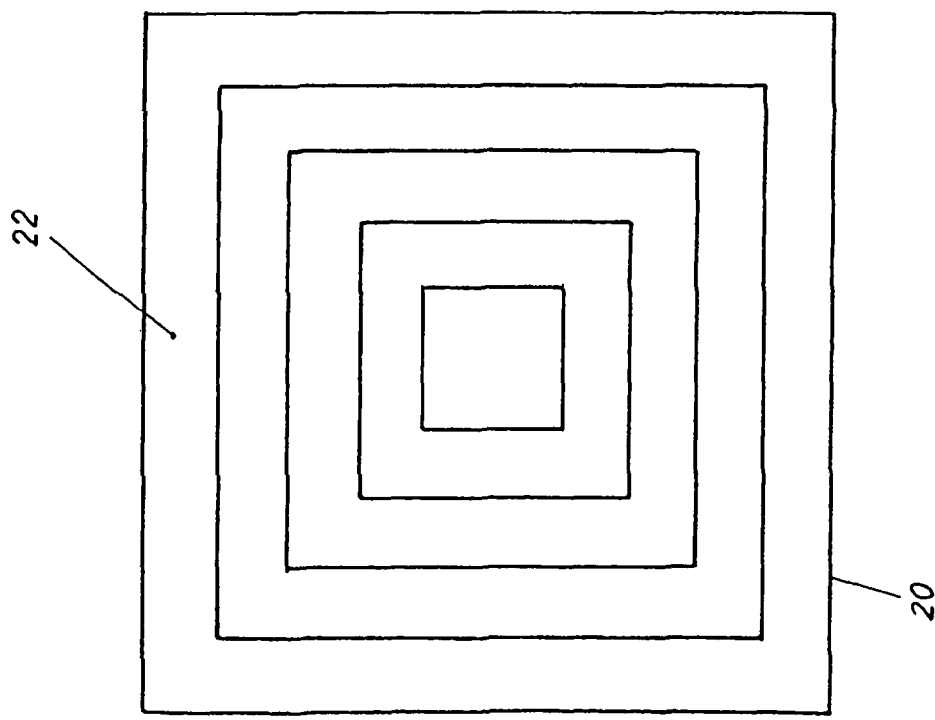
FIG. 2a a top planar view onto a further Fresnel mirror according to the invention.

FIGS. 2a and 2b also show a Fresnel mirror, which focuses and concentrates the sun rays to a focal point F. A section through the Fresnel mirror according to FIGS. 2a and, respectively, 2b is comparable with the section view in FIG. 1b. The Fresnel mirrors in the FIGS. 2a and 2b are however square, i.e. all stages 22 of this Fresnel structure 20 have a quadratic circumferential line. Also an embodiment of the Fresnel structure with rectangular steps is possible.

A Fresnel mirror is shown in FIG. 2a, wherein the Fresnel structure 20, similar to the embodiment according to FIG. 1a, is formed at the upper side of the carrier part 10, namely by design rolling of an aluminum sheet metal. One obtains the same structure, if one composes four sheet metal sections 11, 11', 11", 11''' to a Fresnel mirror, as is shown in FIG. 2b.

Instead of the sheet metal sections 11, 11', 11", 11''' in the same way also extruded profile sections can be composed to a square Fresnel mirror. The construction size of a Fresnel mirror can be increased in this way without that larger reforming devices are necessary during production.

Figure 3:
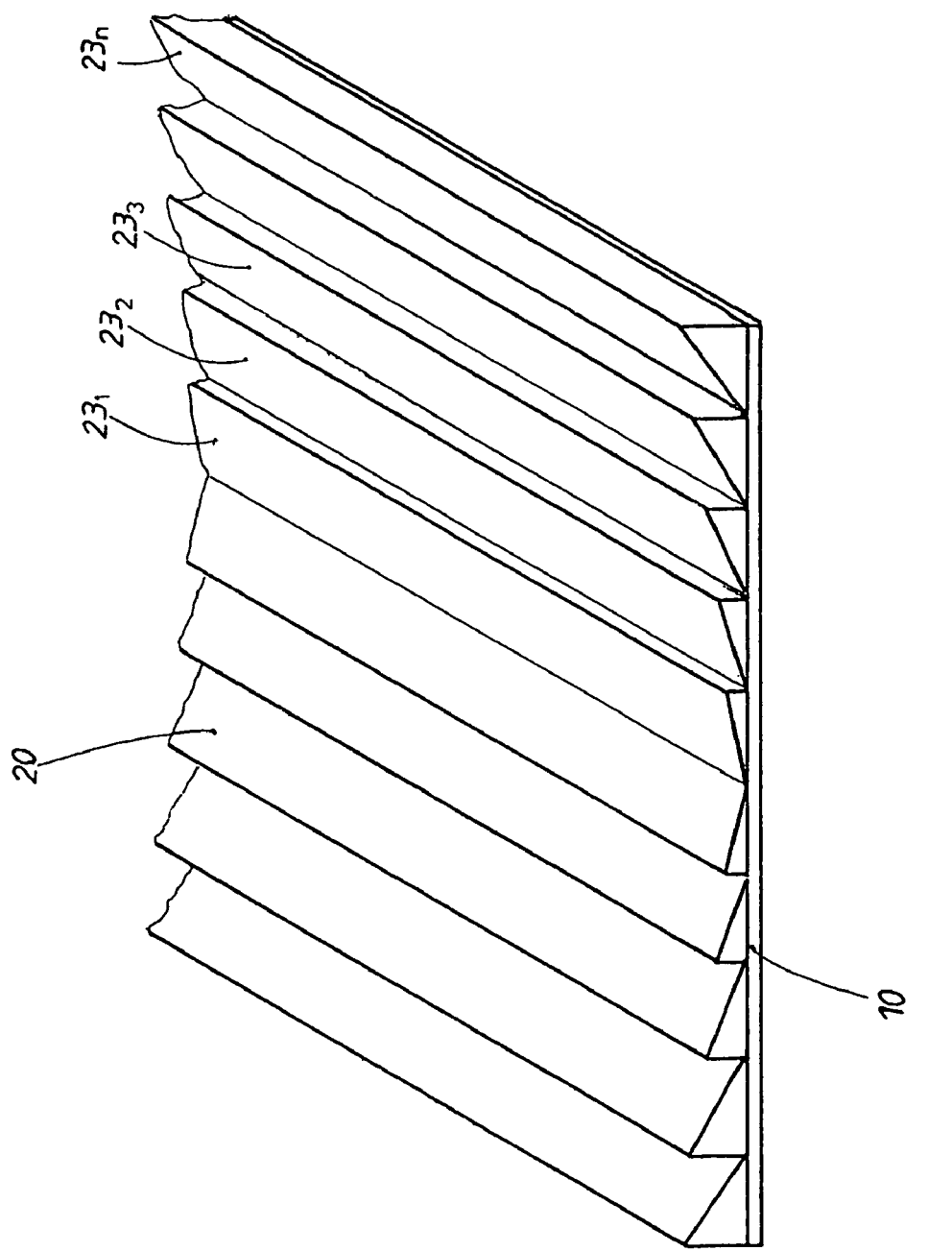
FIG. 3 a perspective view of a further Fresnel mirror.

A Fresnel mirror with a rectangular base face of the carrier part 10 is shown in FIG. 3. The Fresnel structure 20 is disposed at the upper side of the carrier part 10, wherein the Fresnel structure 20 has steps $23_1$, $23_2$, $23_3$ up to $23_n$ aligned parallel to each other. A cross-section through this Fresnel mirror resembles the sectional presentation in FIG. 1b. A focal line is disposed at a distance f, that is at the distance of the focal length f in this case at a distance from the middle line of the Fresnel mirror. Solar cells can be furnished along this focal line for energy gain or however an absorber pipe can be disposed. The Fresnel mirror shown in FIG. 3 was produced from an aluminum sheet metal by design rolling.

Figure 4:
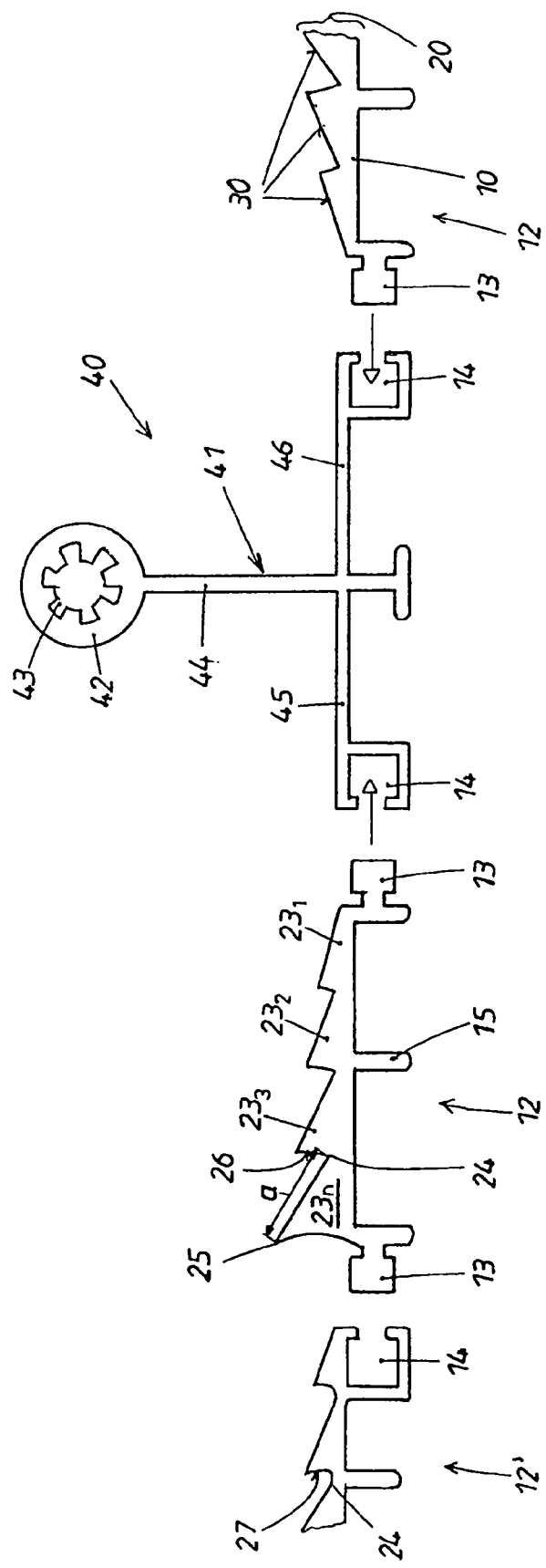
FIG. 4 a section view of a collector unit according to the invention in sectional representation.

A collector unit 40 with a central profile 41 is shown in FIG. 4. Profiles 12, 12' with an in each case symmetrical arrangement are furnished on two sides of this central profile 41. These profiles 12, 12' are supplementing each other in their combined form to a Fresnel mirror. The profiles 12, 12' were generated by extruding. A Fresnel structure 20 is present on the upper side of flat carrier part 10 of the composed profiles. These profiles 12, 12' are pressed as full profiles. It is for purposes of material saving also possible to provide to form the profiles 12, 12' as hollow profiles, such that hollow chambers are furnished between the carrier part 10 and the effective faces 30 of the steps of the Fresnel structure 20. Reinforcement webs 15 are formed at the bottom side of the carrier part 10, which reinforcement webs 15 furnish a sufficient stability to the Fresnel mirror and can also serve as assembly elements. Furthermore, connection means 13, 14 are formed at the narrow sides of the carrier part 10 during extrusion. In this case the profile 12 has connection means 13 having the shape of a groove stone, wherein the groove stone can form-matchingly grip into a corresponding undercut groove 14 of the profile 12'. Such a form-matching connection 13, 14 is also provided toward the central profile 41 such that the parts of the collector unit 40 can be joined in a simple manner.

The steps $23_1$, $23_2$, $23_3$ up to $23_n$ of the profile 12, 12' exhibit the same breadth and a rising angle of incidence with rising distance from the central profile 41, wherein the angle of incidence is comparable with the sectional presentation in FIG. 1b. A forming with changing breadth and/or height of the steps would also be possible. An undercut 26 or, respectively, 27 is furnished at the profiles 12 and 12' at the back side of each step $23_1$, $23_2$, $23_3$ up to $23_n$ for completely exploiting the effective faces 30 in their breadth a. The undercut 26 shown at the steps of the profile 12 represents a concave bulge. The undercut 27 at the profile 12' is also a concave bulge, wherein in this case the bulging is particularly strong at the height level of the step start 24. By providing these undercuts 26, 27 on the back sides of the steps $23_1$, $23_2$, $23_3$ up to $23_n$ of the profiles 12, 12' it is prevented during production with extruding that the effective faces 30 become decreased in extruding by wire edges or burrs or required minimum radii in the region of the step start 24 or the step end 25.

The sun rays reflected by the Fresnel mirror formed by the profiles 12, 12' impinge on a focal line. A collector pipe 42 is furnished along this focal line in this embodiment. This collector pipe 42 has an inner chamber 43, through which flows for example water or another medium. The sun rays reflected by the Fresnel mirror warm the collector pipe 42 and therewith also the media flowing through. This collector pipe 42 is dark colored at its outer side, for example by lacquer application or by powder coating for a better heat transfer. The inwardly directed ribs of the collector pipe 42 contribute to a better heat transfer in the same way. This collector pipe 42 is part of the central profile 41 and is disposed at the upper end of a carrier web 44. A lowest possible heat transfer into the neighboring structure is to be striven for in the attachment of the collector pipe 42. This collector pipe 42 can also be provided as a separate building component. The support web 44 can be furnished out of a poorly heat conducting material or is connected to the collector pipe 42 by a connection element made out of a poorly heat conducting material.

Two side webs 45, 46 protrude from this support web 44 in the lower region. Connection means 14 are furnished at the side webs 45, 46 on the end side for the connection of the profiles 12, 12'. According to further embodiments not illustrated also the side webs 45, 46 can be furnished with effective faces for the Fresnel structure.

The invention is not limited to the illustrated embodiment examples. Further embodiment examples of the Fresnel mirror according to the invention are also conceivable, wherein the Fresnel mirror combined with solar cells can serve for gaining electrical energy or wherein the Fresnel mirror can be combined in connection with collector pipes for obtaining of thermal energy. According to the embodiment examples, the Fresnel mirrors are produced by forming with design rollers of aluminum sheet metal or aluminum extruder profiles as a single piece or as segments of the Fresnel mirror. It is however also conceivable to manufacture the Fresnel structure separately and then to connect it with a carrier part.

LIST OF REFERENCE CHARACTERS

10 carrier part
11, 11', 11", 11''' sheet metal section
12, 12' profile
13, 14 connection means
15 reinforcement web
20 Fresnel structure
$21_1, 21_2, 21_3$ up to $21_n$ step of a concentric Fresnel structure
22 step of a square Fresnel structure
$23_1, 23_2, 23_3$ up to $23_n$ step of a rectangular Fresnel structure
24 step start
25 step end
26 rear under cut
27 rear under cut
30 effective face
$31_1, 31_2, 31_3$ up to $31_n$ effective face of the steps $21_1, 21_2, 21_3$ up to $21_n$
40 collector unit
41 central profile
42 collector pipe
43 inner chamber
44 support web
45, 46 side web
$a, a_1, a_2, a_3$ up to $a_n$ breadth of effective face of $21_1, 21_2, 21_3$ up to $21_n$
$x_1, x_2, x_3$ up to $x_n$ breadth of the step $21_1, 21_2, 21_3$ up to $21_n$

$\alpha_1, \alpha_2, \alpha_3$ up to $\alpha_n$ angle of incidence of the effective faces $31_1, 31_2, 31_3$ up to $31_n$
$\beta$ angle of incidence of the support part 10
f focal length
F focal point

The invention claimed is:

1. Fresnel mirror for the directed reflection of light from a flat carrier part (10), wherein the flat carrier part has a Fresnel structure (20) on its upper side, wherein the individual steps (21; 22; 23;) of the Fresnel structure (20) exhibit a reflecting, planar surface as an effective face (30) for the directed reflection of sun light onto a focal point,
wherein the Fresnel structure (20) is composed out of several sheet metal sections (11, 11', 11", 11''') made out of a steel sheet metal or out of a sheet metal of aluminum or an aluminum alloy or out of several profiles (12, 12', 12") generated by extruding aluminum or an aluminum alloy, wherein connection means (13, 14) are formed at the sheet metal sections (11, 11', 11", 11''') or, respectively, at the profiles (12, 12', 12"), which connection means (13,14) serve for a shape matching connection amongst each other.

2. Fresnel mirror according to claim 1, wherein the connection means (13, 14) are formed at the sheet metal sections (11, 11', 11", 11''') at profiles (12, 12', 12"), which serve for a connection additionally to further components.

3. Fresnel mirror according to claim 1, wherein the carrier part (10) as base part and the Fresnel structure (20) consist of one material, wherein the Fresnel structure (20) is formed into the base part and the effective face (30) of the Fresnel structure (20) is formed by the metal of the carrier part (10).

4. Fresnel mirror according to claim 1, wherein the Fresnel structure (20) is a design structure, an embossed structure, or a structure entered into the carrier part (10) by hydro forming, deep drawing, float forming.

5. Fresnel mirror according to, claim 1 wherein the Fresnel structure (20) is a structure generated during extruding.

6. Fresnel mirror according to, claim 1 wherein the Fresnel structure (20) has ring shaped steps ($21_1, 21_2, 21_3$ up to $21_n$) or square steps (22), which result in a concentric structure for reflection of sun light onto a spatially fixed point, the focal point (F).

7. Fresnel mirror according to claim 1, wherein the Fresnel structure (20) has steps ($23_1, 23_2, 23_3$ up to $23_n$) aligned parallel to each other for reflecting sun light onto a spatially fixed line.

8. A collector unit (40) comprising
a Fresnel mirror according to claim 1, and a central profile (41), wherein the central profile (41) contains at least a collector pipe (42) disposed at the upper end of a vertically standing support web (44) and wherein there are side webs (45, 46) and wherein the side webs (45, 46) have connection means (14), which cooperate with connection means (13) of sheet metal sections (11, 11', 11", 11''') or of profiles (12, 12', 12") of the Fresnel structure (20) of the Fresnel mirror for forming connections.

* * * * *